United States Patent
Lim et al.

(10) Patent No.: US 9,944,792 B2
(45) Date of Patent: Apr. 17, 2018

(54) MODIFIED POLY(ARYLENE ETHER) RESIN COMPOSITION COMPRISING MINERAL OIL AND WIRE PREPARED BY THE COMPOSITION

(71) Applicant: LG CHEM, LTD., Seoul (KR)

(72) Inventors: Sung Hwan Lim, Daejeon (KR); Jong Kuk Choi, Daejeon (KR); Sang Ho Lee, Daejeon (KR); Nam Jib Park, Daejeon (KR); Soo Min Lee, Daejeon (KR); Sung Ho Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 12 days.

(21) Appl. No.: 14/770,647

(22) PCT Filed: Feb. 27, 2015

(86) PCT No.: PCT/KR2015/001909
§ 371 (c)(1),
(2) Date: Aug. 26, 2015

(87) PCT Pub. No.: WO2015/130118
PCT Pub. Date: Sep. 3, 2015

(65) Prior Publication Data
US 2016/0362551 A1    Dec. 15, 2016

(30) Foreign Application Priority Data

Feb. 28, 2014   (KR) .................. 10-2014-0024446
Feb. 26, 2015   (KR) .................. 10-2015-0027221

(51) Int. Cl.
C08L 71/12    (2006.01)
H01B 3/42    (2006.01)
H01B 3/44    (2006.01)

(52) U.S. Cl.
CPC .............. C08L 71/12 (2013.01); H01B 3/427 (2013.01); H01B 3/441 (2013.01); H01B 3/442 (2013.01); *C08L 2201/02* (2013.01); *C08L 2203/202* (2013.01); *C08L 2205/03* (2013.01)

(58) Field of Classification Search
CPC ..... C08L 71/12; C08L 2201/02; H01B 7/295; H01B 3/427; H01B 3/441
USPC ........................................................ 524/100
See application file for complete search history.

(56) References Cited

U.S. PATENT DOCUMENTS

| | | | |
|---|---|---|---|
| 4,772,657 A | | 9/1988 | Akiyama et al. |
| 5,849,001 A | * | 12/1998 | Torimae ............ A61F 13/51401 428/315.5 |
| 6,414,059 B1 | * | 7/2002 | Kobayashi .............. C08L 23/04 523/212 |
| 2008/0113138 A1 | | 5/2008 | Pecak et al. |
| 2011/0079427 A1 | * | 4/2011 | Powale .................. H01B 3/427 174/72 A |
| 2012/0214947 A1 | * | 8/2012 | Klimke ................... C08L 23/10 525/240 |
| 2013/0046049 A1 | * | 2/2013 | Ono ..................... C08L 23/0815 524/434 |

FOREIGN PATENT DOCUMENTS

| | | | |
|---|---|---|---|
| CN | 101563420 A | | 10/2009 |
| JP | 2005-133021 | * | 5/2005 |
| JP | 2006-028315 | * | 2/2006 |
| JP | 2010-509454 A | | 3/2010 |
| JP | 4794302 B2 | | 10/2011 |
| KR | 10-0163445 B1 | | 1/1999 |
| KR | 10-2013-0012580 A | | 2/2013 |
| KR | 10-2013-0077468 A | | 7/2013 |

* cited by examiner

*Primary Examiner* — Deve E Valdez
(74) *Attorney, Agent, or Firm* — Dentons US LLP

(57) ABSTRACT

A modified poly(arylene ether) resin composition includes a mixed resin that includes a poly(arylene ether) resin, a styrene-based resin and a polyolefin resin; a flame retardant; and mineral oil. A weight-average molecular weight of the mineral oil is 460 to 1,000 g/mol. A wire is manufactured using the modified poly(arylene ether) resin composition.

22 Claims, No Drawings

MODIFIED POLY(ARYLENE ETHER) RESIN COMPOSITION COMPRISING MINERAL OIL AND WIRE PREPARED BY THE COMPOSITION

This application is a National Stage Entry of International Application No. PCT/KR2015/001909, filed Feb. 27, 2015, which claims the benefit of priority of Korean Application No. 10-2014-0024446, filed Feb. 28, 2014 and Korean Application No. 10-2015-0027221, filed Feb. 26, 2015, each of which is incorporated by reference in their entirety for all purposes as if fully set forth herein.

TECHNICAL FIELD

The present invention relates to a modified poly(arylene ether) resin composition and a wire manufactured using the same. More particularly, the present invention relates to a modified poly(arylene ether) resin composition to control extrudability and properties of a wire at low cost without negative influence on appearance or properties upon preparation of the wire, and a wire comprising a cable manufactured using the same.

BACKGROUND ART

Conventionally, halogenated resins and a poly(vinyl chloride) resin were generally used as materials of insulated electric wires and wires for light conductors. A poly(vinyl chloride) resin has advantages such as relatively low cost, broad application range and intrinsic flame retardancy, and disadvantages such as generation of dioxin and large amounts of toxic gas upon fire. Accordingly, a variety of materials to replace poly(vinyl chloride) resin are being tried in fields related with electrical wires including cables, but flame retardancy, processability and productivity thereof have failed to meet expectations.

Since a modified poly(arylene ether) resin that is recently attracting attention has superior flame retardancy and insulation, the modified poly(arylene ether) resin is often applied as a substitute for wires in various fields. However, since styrene-based block copolymers that are added to address low flexibility of a poly(arylene ether) resin in a modified poly(arylene ether) resin are relatively expensive, there is burden due to cost increase of raw materials when flexibility of a poly(arylene ether) resin is controlled only using the styrene-based block copolymers.

In addition, while an extrusion flux of a wire manufactured using equipment for mass production of a conventional poly(vinyl chloride) resin is 900 to 1,200 m per minute, the extrusion flux is only approximately 300 m per minute in the case of a conventional modified poly(arylene ether) resin, whereby productivity is dramatically decreased, compared to a poly(vinyl chloride) resin.

As an embodiment regarding conventional modified poly(arylene ether) resin compositions, there is Korean Patent Application Pub. No. 10-2013-0077468. The application relates to a thermoplastic resin composition including a base resin, which includes a poly(arylene ether) resin and a polyolefin resin, and a phosphorus-based flame retardant. The thermoplastic resin composition includes a phosphorus-based flame retardant having a thermal decomposition temperature of 230° C. or more, a poly(arylene ether) resin and a polyolefin resin in a specific content ratio, in order to enhance melt viscosity, processability, flexibility and chemical resistance of a poly(arylene ether) resin and in order to enhance flame retardancy, wear resistance, mechanical strength and thermal resistance of a polyolefin resin. However, in the thermoplastic resin composition, processability of a base resin including a poly(arylene ether) resin and a polyolefin resin is controlled using a styrene-based resin as a compatibilizer.

Therefore, there is a need for development of a modified poly(arylene ether) resin composition that may control extrudability and properties of a wire at low coat without negative influence on appearance or properties upon manufacturing a wire, other than a conventional method in which extrudability and properties of a wire are controlled by controlling the content of expensive styrene-based block copolymer in a modified poly(arylene ether) resin composition.

PRIOR ARTS

Patent Literature (Patent Literature 1) KR10-2013-0077468 A

DISCLOSURE

Technical Problem

Therefore, the present invention has been made in view of the above problems, and it is one object of the present invention to provide a modified poly(arylene ether) resin composition to control extrudability and properties of a wire at low cost without negative influence on appearance or properties upon preparation of the wire.

It is another object of the present invention to provide a wire comprising a cable manufactured using the modified poly(arylene ether) resin composition.

Technical Solution

In accordance with one aspect of the present invention, provided is a modified poly(arylene ether) resin composition comprising a mixed resin that comprises a poly(arylene ether) resin, a styrene-based resin and a polyolefin resin; a flame retardant; and mineral oil, wherein a weight-average molecular weight of the mineral oil is 460 to 1,000 g/mol.

In accordance with another aspect of the present invention, provided is a wire comprising a cable manufactured using the modified poly(arylene ether) resin composition.

Advantageous Effects

As apparent from the foregoing, since a modified poly(arylene ether) resin composition according to the present invention comprises mineral oil, extrudability and properties of a wire may be controlled at low cost without negative influence on appearance or properties upon preparation of the wire.

In addition, the modified poly(arylene ether) resin composition according to the present invention exhibits superior extrudability and enhanced productivity by lowering raw-material costs.

Furthermore, since poly(vinyl chloride) is not included in a wire manufactured using the modified poly(arylene ether) resin composition according to the present invention, eco-friendly effects may be realized.

BEST MODE

The present invention relates to a modified poly(arylene ether) resin composition comprising a mixed resin that comprises a poly(arylene ether) resin, a styrene-based resin and a polyolefin resin; a flame retardant; and mineral oil, wherein a weight-average molecular weight of the mineral oil is 460 to 1,000 g/mol.

In one embodiment, the mixed resin may comprise a poly(arylene ether) resin, a styrene-based resin and a polyolefin resin.

In one embodiment, the poly(arylene ether) resin is a homopolymer of a compound represented by Formula 1 below or a copolymer comprising a compound represented by Formula 1 below:

$$-Ar(R_1R_2R_3R_4)-O-$$ [Formula 1]

wherein $R_1$, $R_2$, $R_3$ and $R_4$ are substituents of aryl (Ar) and are each independently or simultaneously hydrogen, chlorine, bromine, iodine, methyl, ethyl, propyl, aryl, phenyl, methyl benzyl, chloromethyl, bromomethyl, cyanoethyl, cyano, methoxy, phenoxy or a nitro group, and Ar is $C_6$ to $C_{20}$ aryl.

In one embodiment, $R_1$ and $R_2$ in Formula 1 may be alkyl, specifically $C_1$ to $C_4$ alkyl.

In one embodiment, the poly(arylene ether) resin may be a polymer having a polymerization degree of 50 or more.

In one embodiment, poly(phenylene ether) may be used as the poly(arylene ether) resin. In a specific embodiment, the poly(arylene ether) resin may be one or more selected from the group consisting of poly(1,4-phenylene ether), poly(1,3-phenylene ether), poly(1,2-phenylene ether), poly(2-methyl-1,4-phenylene ether), poly(3-methyl-1,4-phenylene ether), poly(2-methyl-1,3-phenylene ether), poly(4-methyl-1,3-phenylene ether), poly(5-methyl-1,3-phenylene ether), poly(6-methyl-1,3-phenylene ether), poly(3-methyl-1,2-phenylene ether), poly(4-methyl-1,2-phenylene ether), poly(5-methyl-1,2-phenylene ether), poly(6-methyl-1,2-phenylene ether), poly(2,6-dimethyl-1,4-phenylene ether), poly(2,3-dimethyl-1,4-phenylene ether), poly(3,5-dimethyl-1,4-phenylene ether), poly(2,5-dimethyl-1,4-phenylene ether), poly(2,4-dimethyl-1,3-phenylene ether), poly(2,5-dimethyl-1,3-phenylene ether), poly(2,6-dimethyl-1,3-phenylene ether), poly(4,5-dimethyl-1,3-phenylene ether), poly(4,6-dimethyl-1,3-phenylene ether), poly(5,6-dimethyl-1,3-phenylene ether), poly(3,4-dimethyl-1,2-phenylene ether), poly(3,5-dimethyl-1,2-phenylene ether), poly(3,6-dimethyl-1,2-phenylene ether), poly(4,5-dimethyl-1,2-phenylene ether), poly(4,6-dimethyl-1,2-phenylene ether) and poly(5,6-dimethyl-1,2-phenylene ether).

In another embodiment, the poly(arylene ether) resin may be a single compound composed of a repeated structural unit of Formula 2 below.

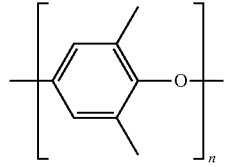

(Formula 2)

In one embodiment, the poly(arylene ether) resin may be comprised in an amount of 30 to 45% by weight, 32 to 43% by weight or 35 to 40% by weight in the mixed resin comprising the poly(arylene ether) resin, the styrene-based resin and the polyolefin resin.

When the poly(arylene ether) resin is used within this amount range in the mixed resin, increase of hardness may be prevented while realizing flame retardancy, the poly(arylene ether) resin may be suitably used in products due to superior tensile strength, elongation and flexibility in a wire, productivity decrease may be prevented by preventing decrease of melt index, and increase of raw-material costs may be prevented.

In addition, when the poly(arylene ether) resin is comprised in an amount of 30% by weight or less, 10 to 30% by weight, or 20 to 30% by weight in total resin compositions, flexibility and elongation with respect to a standard may be desirably satisfied upon extrusion into a wire while realizing proper flame retardancy.

Meanwhile, since the poly(arylene ether) resin has superior insulation, water resistance, dimensional stability, thermal resistance, flame retardancy and mechanical strength, but poor processability and low flexibility due to high melt viscosity, it is inefficient to use the poly(arylene ether) resin alone as a base resin.

Therefore, a styrene-based resin as one embodiment may be mixed in order to provide flexibility to the poly(arylene ether) resin.

In one embodiment, the styrene-based resin, may be a mixture of one or more selected from the group consisting of polystyrene-polybutadiene, polystyrene-poly(ethylene-propylene), polystyrene-polyisoprene, poly(α-methylstyrene)-polybutadiene, polystyrene-polybutadiene-polystyrene, polystyrene-poly(ethylene-propylene)-polystyrene, polystyrene-poly(ethylene-butylene)-polystyrene, polystyrene-(ethylene-butylene/styrene a copolymer)-polystyrene, polystyrene-polyisoprene-polystyrene, poly(α-methylstyrene)-polybutadiene-poly(α-methylstyrene) and selectively hydrogenated variants thereof, as a styrene-based block copolymer.

In one embodiment, the styrene-based resin may be polystyrene-poly(ethylene-butylene)-polystyrene.

In another embodiment, as the styrene-based resin, two polystyrene-poly(ethylene-butylene)-polystyrene types having different polystyrene contents may be used. In a specific embodiment, as the two polystyrene-poly(ethylene-butylene)-polystyrene types in which the content of polystyrene is different, a mixture of polystyrene-poly(ethylene-butylene)-polystyrene comprising 5 to 20% by weight, 8 to 17% by weight or 10 to 15% by weight of polystyrene, and polystyrene-poly(ethylene-butylene)-polystyrene comprising 30 to 50% by weight, 35 to 45% by weight, or 40 to 44% by weight of polystyrene may be mixed in a constant ratio and used.

In one embodiment, a mix ratio of the polystyrene-poly(ethylene-butylene)-polystyrene comprising 5 to 20% by weight of polystyrene to the polystyrene-poly(ethylene-butylene)-polystyrene comprising 30 to 50% by weight of polystyrene may be 1:1.1 to 1:3, 1:1.3 to 1:2.5, or 1:1.5 to 1:2.

In one embodiment, the styrene-based resin may be comprised in an amount of 35 to 50% by weight, 37 to 48% by weight or 40 to 45% by weight in the mixed resin comprising the poly(arylene ether) resin, the styrene-based resin and the polyolefin resin.

When the styrene-based resin is used within this range in the mixed resin, hardness increase and flexibility decrease are prevented and thus the styrene-based resin may be properly used in flexible wires. In addition, superior extrusion flux and excellent productivity are exhibited due to superior flame retardancy, cost effectiveness and prevention of decrease in melt index.

In one embodiment, the polyolefin resin may be polyethylene, polybutene, polypropylene or polyisobutylene.

In one embodiment, the polyolefin resin may comprise soft polypropylene that comprises a rubber ingredient in a constant content. The soft polypropylene together with the styrene-based resin may provide flexibility to poly(arylene ether).

In one embodiment, the rubber ingredient may be one or more selected from ethylene-butene rubber, ethylene-butadiene rubber or ethylene-propylene rubber. In one embodiment, the content of rubber ingredient in the soft polypropylene may be 3 to 12% by weight, 5 to 10% by weight or 6 to 9% by weight.

In one embodiment, the polyolefin resin may be comprised in an amount of 10 to 25% by weight, 13 to 22% by weight, or 15 to 20% by weight in the mixed resin comprising the poly(arylene ether) resin, the styrene-based resin and the polyolefin resin.

When the polyolefin resin in the mixed resin is used within the range, decrease of melt index and tensile strength may be prevented, raw material costs may be lowered while maintaining possessing superior flexibility, upon manufacturing wires comprising cables, by preventing decrease of flame retardancy and increase of hardness.

In addition, when the polyolefin resin is comprised in an amount of 15% by weight or less, 5 to 15% by weight or 8 to 15% by weight in total resin compositions, proper wire flexibility may be realized, flame retardancy is not negatively affected, and properties such as tensile strength, elongation, etc. may be properly realized.

The modified poly(arylene ether) resin composition according to the present invention comprises the mixed resin comprising the poly(arylene ether) resin, the styrene-based resin and the polyolefin resin. In addition, as an embodiment, the modified poly(arylene ether) resin composition may further comprise a flame retardant to enhance flame retardancy of the resin composition.

In one embodiment, the flame retardant may be an eco-friendly halogen-free flame retardant, specifically a phosphorus-based flame retardant.

The phosphorus-based flame retardant is not specifically limited so long as it may be comprised in a poly(arylene ether) resin composition. In a specific embodiment, the phosphorus-based flame retardant may be one or more selected from the group consisting of triphenyl phosphate (TPP), ammonium polyphosphate (phase II), melamine polyphosphate, resorcinol-di(bis-2,6-dimethylphenyl) phosphate (RDP), bisphenol A diphenyl phosphate (BPADP) and diethyl phosphinate ammonium salt (Exolit OP 1230 available from Clariant).

In one embodiment, the flame retardant may be comprised in the modified poly(arylene ether) resin composition in an amount of 20 to 40 parts by weight, 25 to 35 parts by weight or 27 to 33 parts by weight based on 100 parts by weight of the mixed resin comprising the poly(arylene ether) resin, the styrene-based resin and the polyolefin resin.

When the flame retardant is used within this range based on 100 parts by weight of the mixed resin, flame retardancy and thermal resistance are superior, the flame retardant is well dispersed in a composition, and the flame retardant is not protruded from a surface of a processed and molded wire. Accordingly, appearance and quality are not deteriorated, and mechanical properties of a wire are not affected.

The modified poly(arylene ether) resin composition according to the present invention further comprises mineral oil to control extrudability and properties of the mixed resin. In one embodiment, the weight-average molecular weight of the mineral oil is 460 to 1,000 g/mol.

In one embodiment, the mineral oil may be a paraffin-based oil.

In another embodiment, the weight-average molecular weight may be 500 to 900 g/mol, 520 to 800 g/mol or 520 to 750 g/mol. When the mineral oil is used within this weight-average molecular weight range, volatilization upon extrusion may be prevented by maintaining a flash point, hardness increase and elongation decrease may be prevented, and property deterioration due to volatilization of oil upon a heating test may be prevented. In addition, materials may be easily mixed and productivity may be enhanced due to increase of melt index according to viscosity decrease. Accordingly, it is preferable to use a mineral oil having a weight-average molecular weight within the range.

In one embodiment, a mineral oil having a weight-average molecular weight within the range may have a flash point of 250° C. or more, 250 to 400° C., or 260 to 330° C.

In one embodiment, a mineral oil having a weight-average molecular weight within the range may have a viscosity index of 100 or more, 100 to 120, or 105 to 115.

In one embodiment, a mineral oil having a weight-average molecular weight within the range may have an aniline point of 100° C. or more, 100 to 140° C., or 108 to 135° C.

In one embodiment, a mineral oil having a weight-average molecular weight within the range may have a kinematic viscosity (40° C.) of 60 mm$^2$/s or more, 60 to 500 mm$^2$/s, or 90 to 450 mm$^2$/s. In another embodiment, the kinematic viscosity (100° C.) may be 8 mm$^2$/s or more, 8 to 50 mm$^2$/s, or 10 to 35 mm$^2$/s.

Since the present invention uses a mineral oil having the properties, extrudability and properties of a wire may be controlled by controlling the melt index of the modified poly(arylene ether) resin composition according to the present invention.

When a conventional modified poly(arylene ether) resin composition is used, extrudability and properties (tensile strength, elongation, hardness, etc.) of a wire are controlled by controlling a melt index through changing the content of styrene-based resin in order to address low flexibility of a poly(arylene ether) resin. However, the present invention minimizes the content of the styrene-based resin, and controls the melt index of the modified poly(arylene ether) resin composition by changing types and contents of cheap mineral oils, to control wire extrudability and properties.

In other words, since the styrene-based resin is 8 to 10 times more expensive than mineral oil, costs are increased when a melt index is controlled by changing the content of the styrene-based resin. Therefore, the present invention comprises mineral oil, and thus, extrudability and properties of a wire may be controlled at low cost without negative influence on appearance or properties upon manufacturing a wire.

In one embodiment, the mineral oil may be comprised in the modified poly(arylene ether) resin composition in an amount of 1 to 9 parts by weight, 3 to 8 parts by weight, or 5 to 7 parts by weight based on 100 parts by weight of the mixed resin comprising the poly(arylene ether) resin, the styrene-based resin and the polyolefin resin.

When the mineral oil is comprised within the content range based on 100 parts by weight of the mixed resin, a proper melt index range within which a wire may be extruded may be exhibited, hardness increase and elongation decrease may be prevented, and superior tensile strength and flame retardancy are exhibited.

In one embodiment, the modified poly(arylene ether) resin composition according to the present invention may further comprise, within a range within which other properties are not greatly affected, one or more selected from the group consisting of conventionally used lubricants, antioxidants, light stabilizers, chain extenders, reactive catalysts, release agents, pigments, dyes, antistatic agents, antimicrobial agents, processing aids, metal deactivators, anti-smoke agents, fluorine-based anti-dripping agents, inorganic fillers, glass fibers, anti-friction/anti-wear agents and coupling agents.

In one embodiment, the modified poly(arylene ether) resin composition according to the present invention may be used as a wire coating material.

In addition, the present invention relates to a wire comprising a wire manufactured using the modified poly(arylene ether) resin composition. In one embodiment, the wire may be manufactured through a variety of methods such as injection molding, blow molding, extrusion molding, etc., preferably extrusion molding.

In one embodiment, the wire according to the present invention may be manufactured by a method comprising (1) melting/kneading and extruding ingredients of the resin composition at 200 to 290° C.; (2) pelletizing the extruded resin composition; (3) as needed, drying; and (4) processing the pellet through vacuum molding, low-pressure molding, hollow molding, extrusion coating, foam extrusion, etc.

In one embodiment, (3) the drying may be carried out for two to eight hours at 70 to 90° C.

In one embodiment, (4) the processing may be a step of extrusion molding under high shear stress at 230 to 260° C. using extrusion equipment.

In a specific embodiment, the wire according to the present invention may be used in a variety of fields such as power lines, communication lines, wires for vehicles, wires for electronic equipment, wires for nuclear power, wires for wind power, etc. In another embodiment, the resin composition according to the present invention may be used in watchstraps.

Although the preferred embodiments of the present invention are disclosed for illustrative purposes, those skilled in the art will appreciate that various modifications, additions and substitutions are possible, without departing from the scope and spirit of the invention as disclosed in the accompanying claims.

Constituents Used in Modified Poly(Arylene Ether) Resin Compositions According to Examples and Comparative Examples (1) Poly(arylene ether) resin
Poly(phenylene ether): Iupiace PX 100F manufactured by Mitsubishi Engineering Plastics (2) Styrene-based resin
(2-1) SEBS 1: Kraton SEBS G 1657 (styrene content: 13%) manufactured by Kraton Polymers
(2-2) SEBS 2: Kraton SEBS A 1536 (styrene content: 42%) manufactured by Kraton Polymers (3) Polyolefin resin
Polypropylene (EBR content: 7%, MI 23): EC 5082 manufactured by PolyMirae (4) Flame retardant
(4-1) Phosphorus-based flame retardant 1: NONFLA-601 (melamine polyphosphate, N content: 39 to 42%, P content: 14 to 17%) manufactured by DOOBON
(4-2) Phosphorus-based flame retardant 2: OP 1230 (aluminum diethyl phosphate, P content: 23 to 24%) manufactured by Clariant
(4-3) Phosphorus-based flame retardant 3: FP-600 [bisphenol A bis-(diphenyl phosphate)] manufactured by Adeka (5) Mineral oil
(5-1) Mineral oil 1: Kixx LP 600 (Mw: 556.86 g/mol) manufactured by GSCaltex
(5-2) Mineral oil 2: Kixx LP 2200 (Mw: 706.15 g/mol) manufactured by GSCaltex
(5-3) Mineral oil 3: Kixx white 150N (Mw: 407.8 g/mol) manufactured by GSCaltex
(5-4) Mineral oil 4: Kixx white 220N (Mw: 457.3 g/mol) manufactured by GSCaltex (6) Other additives
A flame retardant aid (X-Flon G manufactured by Pocera), a lubricant (Hywax EP-184 manufactured by Hanyang Hwasung), a thermal stabilizer (Irganox B 225FF manufactured by BASF), a processing aid (Pellet S manufactured by Wacker), etc.

Modified poly(arylene ether) resin compositions of Examples 1 to 3 and Comparative Examples 1 to 4 were prepared according to compositions of Table 1 below using the constituents referred to above. Specific properties of mineral oils 1 to 4 and measurement methods thereof used in examples and comparative examples are the same as in Table below. The viscosity index of each mineral oil was calculated from kinematic viscosity (40° C., mm$^2$/s) and kinematic viscosity (100° C., mm$^2$/s) according to ASTM D 2270.

A wire was extrusion-molded using a modified poly(arylene ether) resin composition of each of Examples 1 to 3 and Comparative Examples 1 to 4 prepared according to compositions of Table 1 below.

In particular, each ingredient was mixed according to compositions of Table 1, followed by well mixing using a super mixer. The resultant mixture was input to a twin-screw extruder and melted/kneaded at 200 to 290° C., followed by extrusion. After molding into a final pellet, drying was performed at 80° C. for four hours or more and stood at room temperature for one day. Subsequently, a wire was extruded using HAAKE (wire coating extruder, 9φ) to manufacture a wire specimen. Extrusion-molding of the wire was performed at 230 to 260° C., 80 rpm, and a flux of 30 m/min.

TABLE 1

| Constituting ingredient | Types | Classification | | | | | | |
|---|---|---|---|---|---|---|---|---|
| | | Examples | | | Comparative Examples | | | |
| | | 1 | 2 | 3 | 1 | 2 | 3 | 4 |
| Poly(arylene ether) resin | PX 100F | 28 | 28 | 28 | 28 | 28 | 28 | 28 |
| Styrene-based resin | SEBS G1657 | 11.7 | 11.7 | 11.7 | 11.7 | 11.7 | 11.7 | 11.7 |
| styrene-based | SEBS A1536 | 19.7 | 19.7 | 19.7 | 19.7 | 19.7 | 19.7 | 19.7 |
| resin | Subtotal | 31.4 | 31.4 | 31.4 | 31.4 | 31.4 | 31.4 | 31.4 |
| Polyolefin resin | EC 5082 | 12.8 | 12.8 | 12.8 | 12.8 | 12.8 | 12.8 | 12.8 |
| Flame retardant | NONFLA-601 | 12.8 | 12.8 | 12.8 | 12.8 | 12.8 | 12.8 | 12.8 |
| flame retardant | OP 1230 | 3.4 | 3.4 | 3.4 | 3.4 | 3.4 | 3.4 | 3.4 |
| | FP-600 | 5 | 5 | 5 | 5 | 5 | 5 | 5 |
| | Subtotal | 21.2 | 21.2 | 21.2 | 21.2 | 21.2 | 21.2 | 21.2 |
| Mineral oil | LP 600 | 3 | 5 | | 7 | 10 | | |
| mineral oil | LP 2200 | | | 5 | | | | |
| | 150 N | | | | | | 5 | |
| | 220 N | | | | | | | 5 |
| Other additives | | 1.6 | 1.6 | 1.6 | 1.6 | 1.6 | 1.6 | 1.6 |

(Unit: parts by weight)

TABLE 2

| Test items | Test methods | MO 1 | MO 2 | MO 3 | MO 4 |
|---|---|---|---|---|---|
| Density (15° C., kg/L) | ASTM D 4052 | 0.8626 | 0.887 | 0.856 | 0.862 |

TABLE 2-continued

| Test items | Test methods | MO 1 | MO 2 | MO 3 | MO 4 |
|---|---|---|---|---|---|
| Kinematic viscosity (40° C., mm²/s) | ASTM D 445 | 101.1 | 442.6 | 30.39 | 49.3 |
| Kinematic viscosity (100° C., mm²/s) | ASTM D 445 | 12.16 | 32.06 | 5.324 | 7.2 |
| Pour point (° C.) | ASTM D 97 | −21 | −12.5 | −15 | −30 |
| Flash point (COC, ° C.) | ASTM D 92 | 268 | 324 | 226 | 248 |
| Viscosity index | ASTM D 2270 | 112 | 105 | 108 | 104 |
| Aniline point (° C.) | ASTM D 611 | 130.3 | 109.5 | 110.6 | 116.6 |
| Weight-average molecular weight (g/mol) | ASTM D 2502 | 556.86 | 706.15 | 407.8 | 457.3 |

Extrusion properties of the compositions of examples and comparative examples extruded to wires are summarized in Table 3 below, and property measurement results of wire specimens according to Examples and Comparative Examples are summarized in Table 4 below.

In regard to wire extrusion characteristics of Table 3 below, wire extrudability was evaluated with the naked eye according to a method described in UL 1581 standard, and were classified as ⊚, ○, Δ, and x based on appearance quality and productivity upon wire extrusion.

In addition, properties except for a melt index (MI) and hardness of wire specimens of Table 4 below were measured according to UL 1581 standard, melt index was measured under conditions of 250° C., a load of 10 kg and a residence time of 300 seconds according to ASTM D1238-10 standard, and Shore hardness was measured according to ASTM D2240-05(2010).

TABLE 3

| | Classification | | | | | | |
|---|---|---|---|---|---|---|---|
| | Examples | | | Comparative Examples | | | |
| Classification | 1 | 2 | 3 | 1 | 2 | 3 | 4 |
| Wire extrudability | ⊚ | ⊚ | ⊚ | ○ | X | ○ | ○ |
| Torque upon extrusion (N · m) | 32 | 29 | 32 | 28 | 27 | 29 | 29 |
| Pressure upon extrusion (bar) | 42 | 35 | 41 | 30 | 26 | 30 | 33 |

TABLE 4

| | Classification | | | | | | |
|---|---|---|---|---|---|---|---|
| | Examples | | | Comparative Examples | | | |
| | 1 | 2 | 3 | 1 | 2 | 3 | 4 |
| Melt index (g/10 min) | >30 | >40 | >30 | >60 | >80 | >50 | >50 |
| Tensile strength (room temperature, T/S) | >200 | >200 | >200 | >150 | >100 | >200 | >200 |
| Elongation (room temperature, T/E) | >200 | >200 | >200 | >150 | >150 | >200 | >200 |
| Hardness (Shore A) | 89 | 86 | 88 | 85 | 83 | 88 | 87 |
| Flame retardancy (VW-1) | Pass | Pass | Pass | Fail | Fail | Pass | Fail |

As shown in Table 3, wire extrusion characteristics depend upon mineral oil types.

That is, even though the content of mineral oil is the same in Examples 2 and 3 and Comparative Examples 3 and 4, Examples 2 and 3 respectively comprising mineral oil 1 (Mw: 556.86 g/mol) and mineral oil 2 (Mw: 706.15 g/mol) having a weight-average molecular weight comprised in the weight-average molecular weight range of the present invention exhibit superior wire extrudability, when compared with Comparative Examples 3 and 4 respectively comprising mineral oil 3 and 4 in a amount outside the mineral oil content range of the present invention. In this regard, since torque upon extrusion and pressure of Examples 1 to 3 are most proper, wire extrudability in Examples 1 to 3 is judged as being advantageously affected, when compared with comparative examples. For reference, since load occurs in an extruder when torque is extremely high upon extrusion and appearance of a wire may be effectively formed under a certain pressure or more upon extrusion, low wire torque and low pressure upon extrusion are preferable. Accordingly, it can be confirmed that, since the molecular weights of mineral oils 1 and 2 are relatively larger than those of mineral oils 3 and 4 (accordingly, viscosity, flash point and the like are high), the melt index of the modified poly(arylene ether) resin composition is affected (that is, a melt index decreases with increasing molecular weight of mineral oil), and thus, extrudability is affected.

In addition, as shown in Table 4, Examples 2 and 3 respectively using mineral oils 1 and 2 exhibit superior flame retardancy, when compared with Comparative Example 4 using mineral oil 4. Accordingly, wire properties are shown to depend upon mineral oil types.

In addition, as shown in Tables 3 and 4, even though Examples 1 and 2 and Comparative Examples 1 and 2 use the same mineral oil 1 (Mw: 556.86 g/mol), Comparative Examples 1 and 2 using mineral oil 1 in an amount of greater than 9 parts by weight based on 100 parts by weight of the mixed resin comprising the poly(arylene ether) resin, the styrene-based resin and the polyolefin resin have an extremely high melt index, whereby wire extrudability is decreased and properties such as tensile strength, elongation, hardness and flame retardancy are decreased. Accordingly, it can be confirmed that mineral oil 1 is preferably not used in an amount of greater than 9 parts by weight.

In addition, a commercially available wire (manufactured by SABIC) was analyzed and it was confirmed that the wire included 53 to 59% by weight of a styrene-based resin. Accordingly, it can be confirmed that the styrene-based resin is included in a larger amount, when compared to the modified poly(arylene ether) resin composition according to the present invention.

For reference, the styrene-based resin (particularly, styrene-based block copolymer) is expensive, i.e. 9,000 won/kg or more, but mineral oil is relatively cheap, i.e. 1,500 won/L or less.

Based on the results, since, while properties such as extrudability, hardness, tensile strength and elongation of the conventional poly(arylene ether) resin composition are controlled by controlling the content of expensive styrene-based resin, such properties in the present invention are controlled by controlling types and the content of cheap mineral oil, extrudability and properties of a wire may be controlled at low cost without negative influence on appearance or properties upon manufacturing a wire.

In addition, since the modified poly(arylene ether) resin composition according to the present invention has superior extrudability and uses a relatively cheap raw material, productivity may be enhanced.

In addition, a wire manufactured using the modified poly(arylene ether) resin composition according to the present invention does not comprise a poly(vinyl chloride) material, and thus, the wire is eco-friendly.

What is claimed is:

1. A modified poly(arylene ether) resin composition comprising a mixed resin that comprises a poly(arylene ether) resin, a styrene-containing resin and a polyolefin resin; a flame retardant; and mineral oil, wherein a weight-average molecular weight of the mineral oil is 460 to 1,000 g/mol, and wherein the styrene-containing resin is a mixture of polystyrene-poly(ethylene-butylene)-polystyrene comprising 5 to 20% by weight of polystyrene based on the total weight of the polystyrene-poly(ethylene-butylene)polystyrene and polystyrene-poly(ethylene-butylene)-polystyrene comprising 30 to 45% by weight of polystyrene based on the total weight of the polystyrene-poly(ethylene-butylene) polystyrene,
wherein a mix ratio of the polystyrene-poly(ethylene-butylene)-polystyrene comprising 5 to 20% by weight of polystyrene to the polystyrene-poly(ethylene-butylene)-polystyrene comprising 30 to 45% by weight of polystyrene is 1:1.1 to 1:3, and
wherein the flame retardant is a mixture of melamine polyphosphate, bisphenol A diphenyl phosphate and diethyl phosphinate ammonium salt.

2. The modified poly(arylene ether) resin composition according to claim 1, wherein the mineral oil is a paraffin oil.

3. The modified poly(arylene ether) resin composition according to claim 1, wherein a weight-average molecular weight of the mineral oil is 500 to 900 g/mol.

4. The modified poly(arylene ether) resin composition according to claim 1, wherein a flash point of the mineral oil is 250° C. or more.

5. The modified poly(arylene ether) resin composition according to claim 1, wherein a viscosity index of the mineral oil is 100 or more.

6. The modified poly(arylene ether) resin composition according to claim 1, wherein an aniline point of the mineral oil is 100° C. or more.

7. The modified poly(arylene ether) resin composition according to claim 1, wherein a kinematic viscosity (40° C.) of the mineral oil is 60 mm²/s or more.

8. The modified poly(arylene ether) resin composition according to claim 1, wherein a kinematic viscosity (100° C.) of the mineral oil is 8 mm²/s or more.

9. The modified poly(arylene ether) resin composition according to claim 1, wherein the poly(arylene ether) resin is a homopolymer of a compound represented by Formula 1 below or a copolymer comprising a compound represented by Formula 1 below:

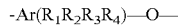   [Formula 1]

wherein R1, R2, R3 and R4 are substituents of aryl (Ar) and are each independently or simultaneously hydrogen, chlorine, bromine, iodine, methyl, ethyl, propyl, aryl, phenyl, methyl benzyl, chloromethyl, bromomethyl, cyanoethyl, cyano, methoxy, phenoxy or a nitro group, and Ar is C6 to C20 aryl.

10. The modified poly(arylene ether) resin composition according to claim 1, wherein the styrene-containing resin is a styrene-based block copolymer.

11. The modified poly(arylene ether) resin composition according to claim 1, wherein the polyolefin resin is soft polypropylene comprising an ethylene-butene rubber, an ethylene-butadiene rubber or an ethylene-propylene rubber.

12. The modified poly(arylene ether) resin composition according to claim 1, wherein the poly(arylene ether) resin is present in an amount of 30 to 45% by weight based on the total weight of the mixed resin comprising the poly(arylene ether) resin, the styrene-containing resin and the polyolefin resin.

13. The modified poly(arylene ether) resin composition according to claim 1, wherein the styrene-containing resin is present in an amount of 35 to 50% by weight based on the total weight of the mixed resin comprising the poly(arylene ether) resin, the styrene-containing resin and the polyolefin resin.

14. The modified poly(arylene ether) resin composition according to claim 1, wherein the polyolefin resin is present in an amount of 10 to 25% by weight based on the total weight of the mixed resin comprising the poly(arylene ether) resin, the styrene-based resin and the polyolefin resin.

15. The modified poly(arylene ether) resin composition according to claim 1, wherein the flame retardant is present in an amount of 20 to 40 parts by weight based on 100 parts by weight of the mixed resin comprising the poly(arylene ether) resin, the styrene-containing resin and the polyolefin resin.

16. The modified poly(arylene ether) resin composition according to claim 1, wherein the mineral oil is comprised in an amount of 1 to 9 parts by weight based on 100 parts by weight of the mixed resin comprising the poly(arylene ether) resin, the styrene-containing resin and the polyolefin resin.

17. The modified poly(arylene ether) resin composition according to claim 11, wherein a content of the ethylene-butene rubber, the ethylene-butadiene rubber or the ethylene-propylene rubber in the soft polypropylene is 3 to 12% by weight based on the total weight of the soft polypropylene.

18. The modified poly(arylene ether) resin composition according to claim 1, wherein the modified poly(arylene ether) resin composition further comprises one or more additives selected from the group consisting of lubricants, antioxidants, light stabilizers, chain extenders, reactive catalysts, release agents, pigments, dyes, antistatic agents, antimicrobial agents, processing aids, metal deactivators, anti-smoke agents, fluorine-based anti-dripping agents, inorganic fillers, glass fiber, anti-friction/anti-wear agents and coupling agents.

19. The modified poly(arylene ether) resin composition according to claim 1, wherein the poly(arylene ether) resin is present in an amount of 30% by weight or less in total resin compositions.

20. The modified poly(arylene ether) resin composition according to claim 1, wherein the polyolefin resin is present in an amount of 15% by weight or less in total resin compositions.

21. A wire manufactured using the modified poly(arylene ether) resin composition according to claim 1.

22. The modified poly(arylene ether) resin composition according to claim 1, wherein a weight-average molecular weight of the mineral oil is 500 to 900 g/mol, and wherein a flash point of the mineral oil is 260 to 330° C., a viscosity index of the mineral oil is 105 to 115, a kinematic viscosity (40° C.) of the mineral oil is 90 to 450 mm$^2$/s, a kinematic viscosity (100° C.) of the mineral oil is 10 to 30 mm$^2$/s.

* * * * *